(12) United States Patent
Taylor et al.

(10) Patent No.: US 7,878,142 B2
(45) Date of Patent: Feb. 1, 2011

(54) DEVICE TO COAT FOOD PRODUCTS SUCH AS POTATO CRISPS

(75) Inventors: Alfred A. Taylor, Lugarno (AU); Garry R. Mackay, Lidcombe (AU)

(73) Assignee: TNA Australia Pty Limited, Lidcombe, New South Wales (AU)

( * ) Notice: Subject to any disclaimer, the term of this patent is extended or adjusted under 35 U.S.C. 154(b) by 993 days.

(21) Appl. No.: 11/009,380

(22) Filed: Dec. 10, 2004

(65) Prior Publication Data

US 2005/0172836 A1 Aug. 11, 2005

(30) Foreign Application Priority Data

Dec. 15, 2003 (AU) ............................. 2003906941

(51) Int. Cl.
*B05C 19/04* (2006.01)
(52) U.S. Cl. ..................... 118/13; 118/19; 118/308; 118/317; 99/494
(58) Field of Classification Search ................ 118/13, 118/19, 308, 417; 99/494; 198/406, 409, 198/774.4; 426/289, 295
See application file for complete search history.

(56) References Cited

U.S. PATENT DOCUMENTS

| 2,893,332 | A | * | 7/1959 | Roser et. al. ................ 426/294 |
| 3,894,508 | A | * | 7/1975 | Burgess ....................... 118/19 |
| 4,078,517 | A | | 3/1978 | Morris et al. |
| 5,711,805 | A | * | 1/1998 | Vassiliou ..................... 118/13 |
| 6,591,777 | B2 | | 7/2003 | Comeron |

FOREIGN PATENT DOCUMENTS

| GB | 2 129 270 A | 5/1984 |
| GB | 2 383 937 A | 2/2002 |

* cited by examiner

*Primary Examiner*—Laura Edwards
(74) *Attorney, Agent, or Firm*—Townsend and Townsend and Crew, LLP

(57) ABSTRACT

A device (10) to coat food products such as potato crisps or chips and biscuits. The device (10) includes a flavor dispenser 21 that delivers granular flavor material to the products (12) being coated. The device (10) further includes a conveyor (11) with conveyor surfaces (15 to 18) that are arranged in cascade so that the food products tumble from one surface to the next so that the granular flavor material is applied to the various surfaces of the food products.

9 Claims, 1 Drawing Sheet

DEVICE TO COAT FOOD PRODUCTS SUCH AS POTATO CRISPS

TECHNICAL FIELD

The present invention relates to devices to coat articles that are relatively thin and have major surfaces that are to be coated with a granular material.

BACKGROUND OF THE INVENTION

Food products such as potato crisps or chips are frequently coated with a flavor. This flavor is applied to the major surfaces of the potato crisp in a tumbling machine. The machine consists merely of a drum into which the potato crisps are delivered together with the flavoring in granular form. The drum is rotated until it is considered that the potato crisps have their major surfaces coated to the degree required.

The above-described device and method for coating food products damages a certain proportion of the food products. Further disadvantages include down time for cleaning and flavoring changes.

OBJECT OF THE INVENTION

It is an object of the present invention to overcome or substantially ameliorate the above disadvantages.

SUMMARY OF THE INVENTION

There is disclosed herein a device to coat relatively thin articles with a granular material, the articles having opposite major faces, the device including:

a conveyor having a plurality of conveyor surfaces arranged in cascade and upon which the articles are deposited to be conveyed therefrom from an upstream portion of the conveyor to a downstream portion of the conveyor, each surface having an upstream end and a downstream end, with the downstream end of at least some of the surfaces being located above the next downstream surface so that the articles tumble fall to the next downstream surface, with alternate faces of the articles being exposed as the result of the tumbling; and a granular material dispenser located to deliver the granular material to the major faces of the articles to coat the articles.

Preferably, the conveyor is a linear slip or vibratory conveyor, with the surfaces being joined so as to reciprocate in unison.

Preferably, the conveyor is adapted to coat food products such as potato crisps.

Preferably, the dispenser is located above the surfaces.

BRIEF DESCRIPTION OF THE DRAWINGS

A preferred form of the present invention will now be described by way of example with reference to the accompanying drawings.

DETAILED DESCRIPTION OF THE PREFERRED EMBODIMENT

Figure 1:
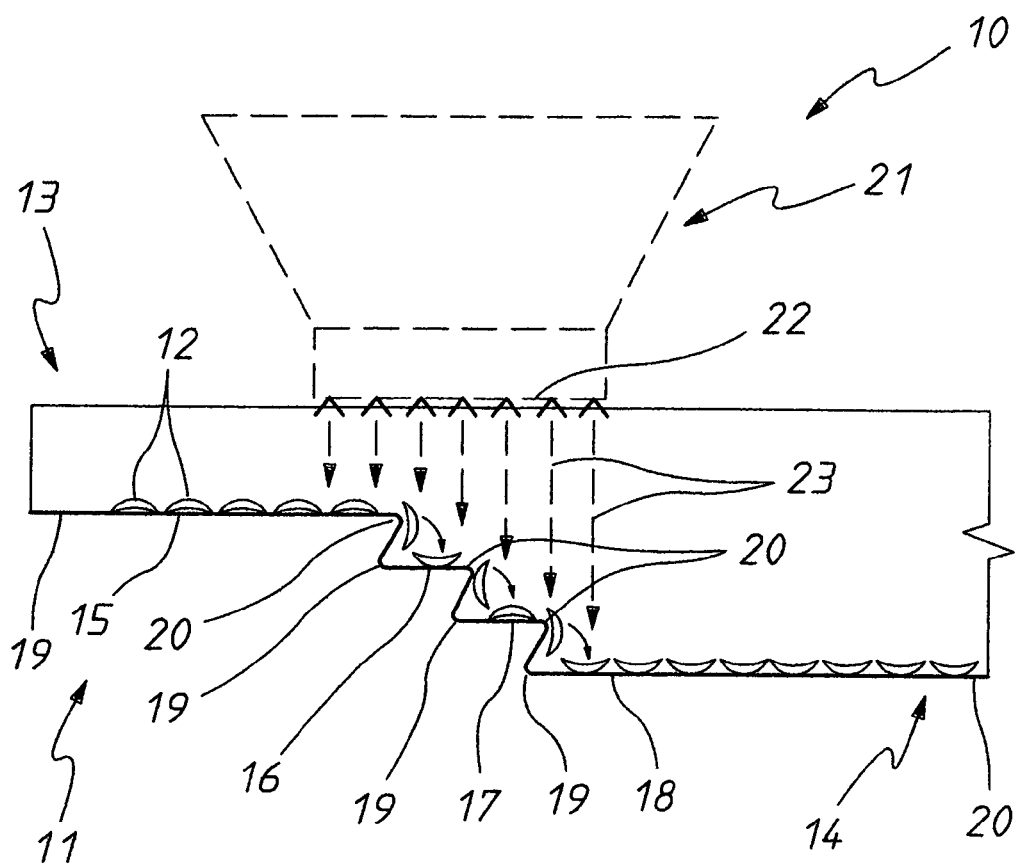
FIG. 1 is a schematic side elevation of a device to coat potato crisps with a flavoring.

In the accompanying drawings there is schematically depicted a device 10 to coat food products 12 that are relatively thin and have major faces, such as potato crisps and biscuits.

The device 10 includes a conveyor 11 that conveys the food products 12 from an upstream portion 13 of the conveyor 11 to a downstream portion 14. The conveyor 11 may be a linear slip or vibratory conveyor.

The conveyor 11 includes a plurality of conveyor surfaces 15 to 18, with each surface 15 to 18 having an upstream end 19 and a downstream end 20.

The surfaces 15 to 18 are arranged in cascade so that the downstream end 20 of each conveyor surface 15, 16 and 17 is located above the next downstream conveyor surface 16, 17 or 18.

Figure 2:
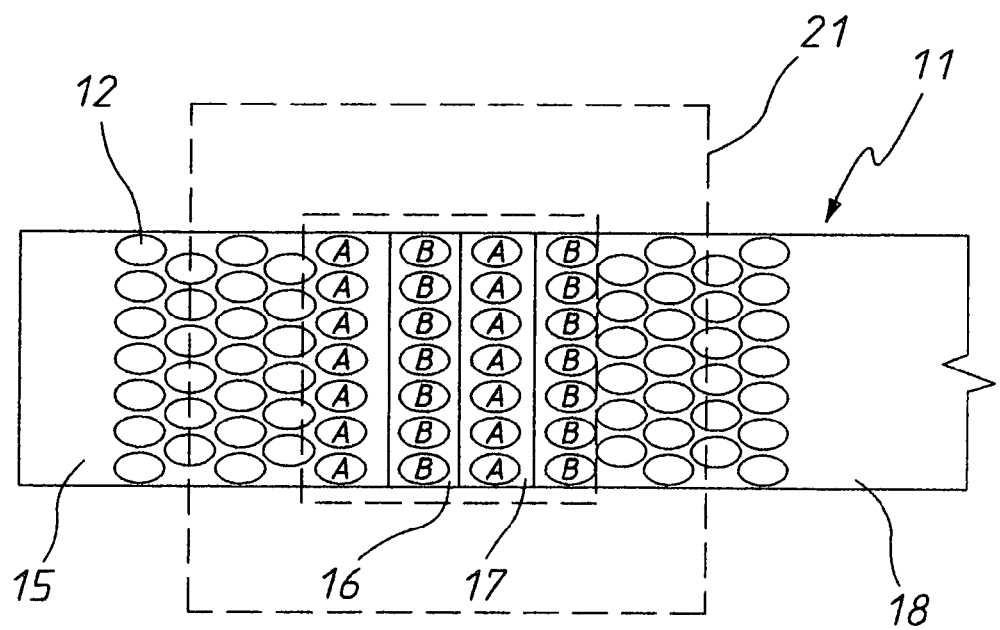
FIG. 2 is a schematic top plan view of the device of FIG. 1.

More particularly as the food products 12 are transferred from each upstream surface 15, 16 or 17 to the next adjacent downstream surface 16, 17 or 18, the food products 12 tumble fall so that alternative faces of the products 12 are exposed upwardly. For example, as is best seen in FIG. 2, the food products 12 are located on the surface 15 so that the upper surface is surface "A". When the food products 12 tumble fall to the surface 16, the other major face "B" is exposed upwardly. This process is repeated so that alternate faces "A" and "B" are exposed upwardly.

Located above the surfaces 15 to 18 is a flavor dispenser 21 having an outlet 22 that provides a plurality of curtains 23 of granular flavor material to be deposited on the upwardly exposed face of the food products 12.

With respect to the above conveyor 11, the conveyor 11 may consist of a number of discrete conveyor segments, each providing a respective one of the surfaces 15 to 18. Each conveyor segment may include its own drive assembly.

With respect to the above-described preferred embodiment, the downstream end 20 of each surface 15 to 18 includes a transverse edge, that is an edge extending transverse of the longitudinal direction of extension of the conveyor 10, so that each edge extends generally transverse of the direction of movement of the food products 12.

The invention claimed is:

1. A device to coat relatively thin articles with a granular material, the articles having opposite major faces, said device including:

a conveyor having a plurality of conveyor surfaces arranged in cascade and upon which the articles are deposited to be conveyed therefrom from an upstream portion of the conveyor to a downstream portion of the conveyor, each surface having an upstream end and a downstream end, with the downstream end of at least some of the surfaces being located above the next downstream surface so that the articles tumble fall to the next downstream surface, with alternate faces of the articles being exposed as the result of the tumbling, said conveyor being a linear slip or linear vibratory conveyor, with the surfaces being joined so as to reciprocate in unison; and a granular material dispenser located to deliver a stream of the granular material directed at least two of the surfaces so that the granular material is applied to the major faces of the articles to coat the articles as a result of the exposure of said alternate faces.

2. The device of claim 1, wherein the conveyor is adapted to coat food products.

3. The device of claim 2 wherein the food products comprise potato chips.

4. The device of claim 1, wherein said dispenser is located above the surfaces.

5. A device according to claim 1 wherein the at least two of the surfaces partially overlie each other.

6. A device to coat relatively thin food products with a granular material, the products having opposite major faces, said device including:
- a conveyor having a plurality of conveyor surfaces arranged in cascade and upon which the products are deposited to be conveyed therefrom from an upstream portion of the conveyor to a downstream portion of the conveyor, each surface having an upstream end and a downstream end, with the downstream end of at least some of the surfaces being located above the next downstream surface so that the products tumble fall to the next downstream surface, with alternate faces of the products being exposed as the result of the tumbling, said conveyor being a linear slip or linear vibratory conveyor, with the surfaces being joined so as to reciprocate in unison; and
- a granular material dispenser located to deliver a stream of the granular material directed at the surfaces, the surfaces at which the stream of granular material is directed including at least two surfaces so that the granular material is applied to the major faces of the products to coat the products as a result of the exposure of said alternate faces.

7. The device of claim 6, wherein said dispenser is located above the surfaces.

8. A device to coat relatively thin food products with a granular material, the products having opposite major faces, said device including:
- a conveyor having first and second conveyor surfaces upon which the products lie for conveyance from an upstream portion of the conveyor to a downstream portion of the conveyor, each surface having an upstream end and a downstream end, the downstream end of the first surface being located above the second surface so that the products tumble fall from the first surface to the second surface and the major faces of the products alternatingly face away from the respective first and second surfaces while the products lie on the surfaces; and
- a granular material dispenser located to deliver a stream of the granular material towards the products lying on the first and second surfaces so that the major faces of the products face the stream of granular material and the major faces of the products become coated with the granular material as a result of their exposure to the granular material stream while lying on the respective first and second surfaces.

9. A device according to claim 8 wherein the products lie on the first and second surfaces in a single layer.

* * * * *